United States Patent [19]

Huang

[11] Patent Number: 5,079,754
[45] Date of Patent: Jan. 7, 1992

[54] END-FACE WAVING GEAR REDUCER

[76] Inventor: Kuo C. Huang, 195, Chung Hsing Rd., Sec. 4, Chutung, Hsinchu, Taiwan, Taiwan

[21] Appl. No.: 519,878

[22] Filed: May 7, 1990

[51] Int. Cl.[5] .................. F16H 35/00; G04B 35/00
[52] U.S. Cl. ................................ 368/322; 74/640; 368/323; 368/324; 368/220
[58] Field of Search ............... 74/640; 368/220, 322, 368/323, 324

[56] References Cited

U.S. PATENT DOCUMENTS

| 3,468,122 | 9/1969 | Lee .................................. 368/324 |
| 3,501,978 | 3/1970 | Ferrell ............................... 74/640 |
| 3,525,890 | 8/1970 | Buchanan, Jr. ................. 74/640 X |
| 3,532,005 | 10/1970 | Bremner, Jr. et al. ............. 74/640 |
| 3,977,275 | 8/1976 | Kiesewetter et al. ........... 74/640 X |
| 4,308,610 | 12/1981 | Walker ............................. 368/323 |
| 4,378,957 | 4/1983 | Malkin et al. .................... 368/220 |
| 4,646,587 | 3/1987 | Danel ................................ 74/640 |
| 4,742,729 | 5/1988 | Cordara ............................ 74/640 |

FOREIGN PATENT DOCUMENTS 0122208 10/1984 European Pat. Off. ............. 74/640
0214544 9/1988 Japan ................................... 74/640

Primary Examiner—Allan D. Herrmann
Assistant Examiner—Ryan W. Massey
Attorney, Agent, or Firm—Leonard Bloom

[57] ABSTRACT

A rotational transmission reducer having plane waving gear mechanism comprises at least a reducer unit of an input member, an output member, and a plane flexible member which lays between the input member and the output member. The reducer unit may be coaxially piled to be a multistage reducer. A typical example is a transmission of a clock or a watch, which can simplify a conventional mechanism and lower the manufacturing cost. The reducer unit functions by some salient portions on the input member pushing the flexible member, to engage a part of a ring gear furnished on the flexible member with another ring gear furnished on the output member. The output member is rotated by differential pitches of aforesaid two ring gears. For a clock or watch transmission, the ring gear on the output member is an independent member joined frictionally with a substance of the output member so that they can be slid relatively for time adjustment.

5 Claims, 4 Drawing Sheets

END-FACE WAVING GEAR REDUCER

FIELD OF THE INVENTION

The present invention relates generally to a reducer and particularly to a reducer comprising waving gear mechanism.

BACKGROUND OF THE INVENTION

A conventional clock or watch generally uses complex gear train for transmission, so the assembly is complicated and is hard to reduce manufacturing cost.

SUMMARY OF THE INVENTION

A reducer of the present invention comprises at least a coaxial reducer unit formed by an input member, an output member and a plane flexible member laying between the input member and the output member. By means of a salient portion on the input member partly deforming the flexible element to engage a part of a ring gear furnished on the flexible member with another ring gear furnished on the output member, the output member rotates by differential pitches of both said ring gears. It can be applied to any low rate and low-load device, typically a clock, a watch or the like.

Advantages of a reducer in accordance with the present invention will be apparent from the detailed description of the invention with reference to the drawings.

DESCRIPTION OF THE PREFERRED EMBODIMENTS

Figure 1:
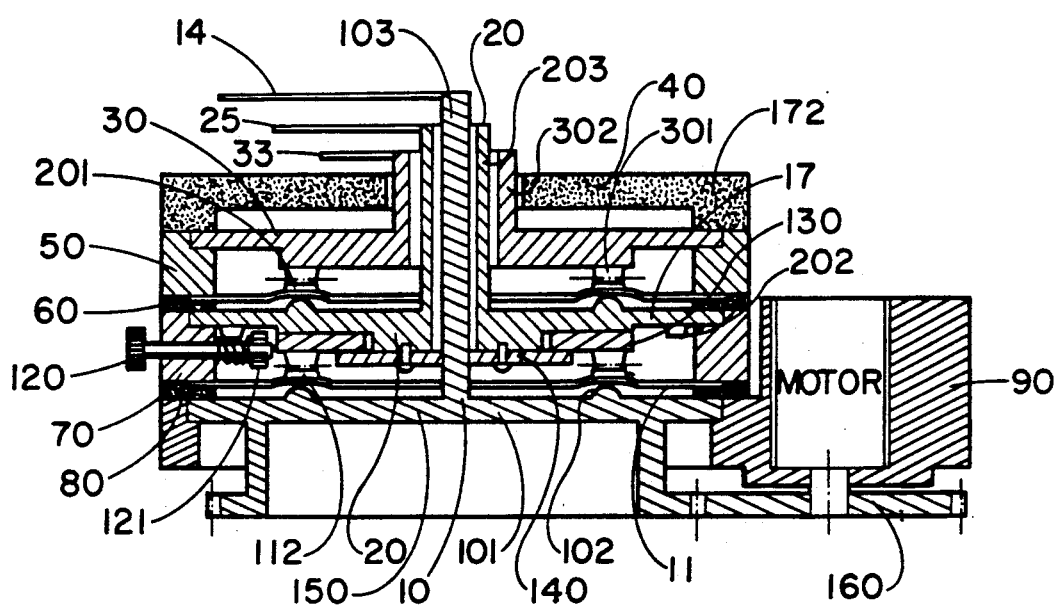
FIG. 1 is a sectional view of an embodiment of the present invention.
Figure 2:
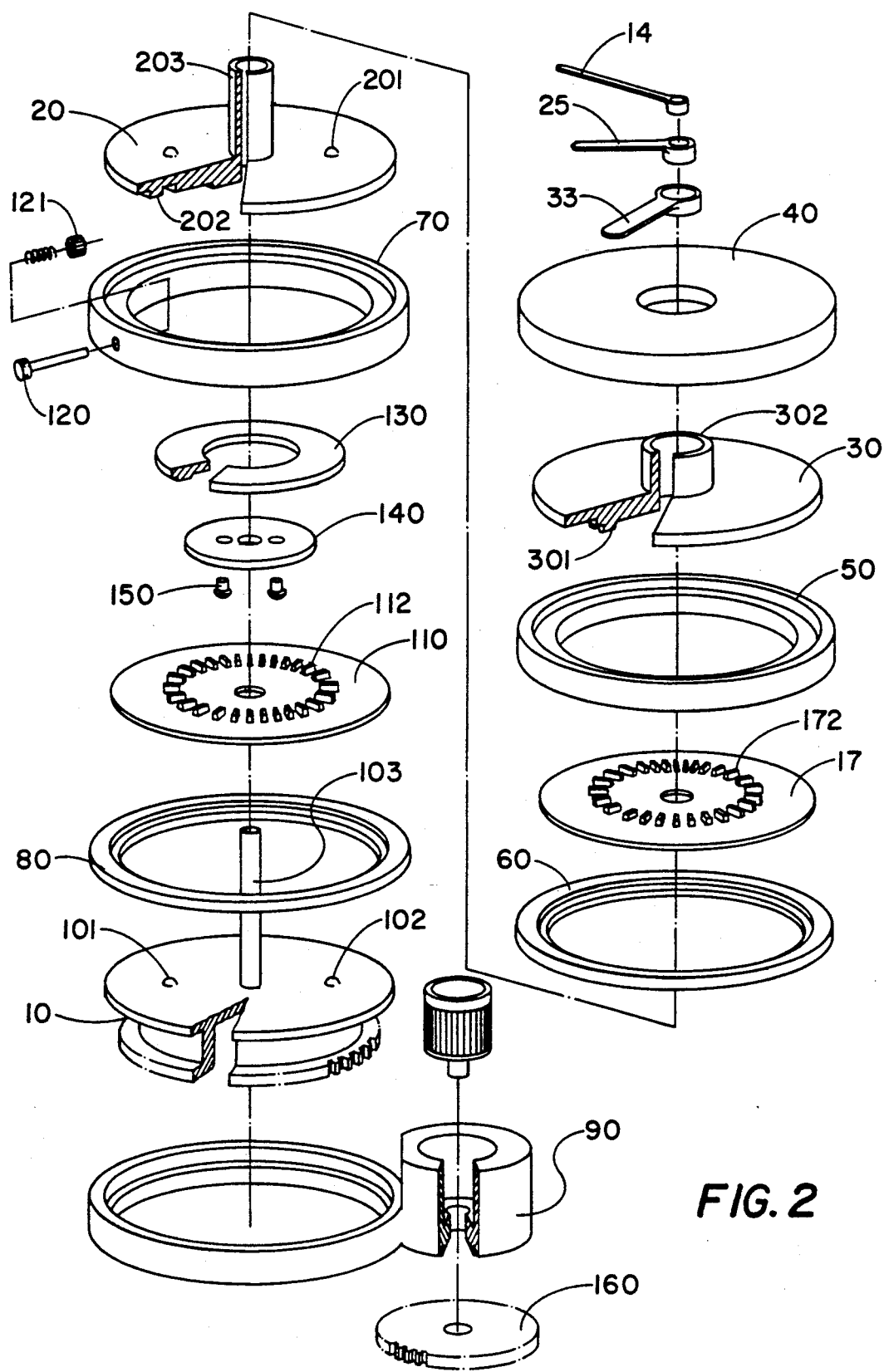
FIG. 2 is an explicit diagram of the same embodiment of the present invention.
Figure 3D:
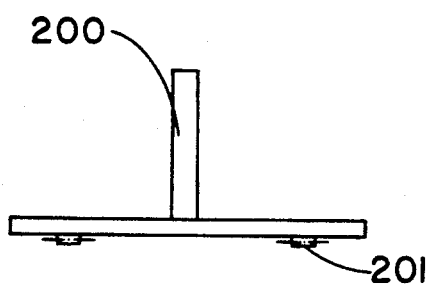
FIG. 3D is a bottom view of the member shown in FIG. 3A.
Figure 3A:
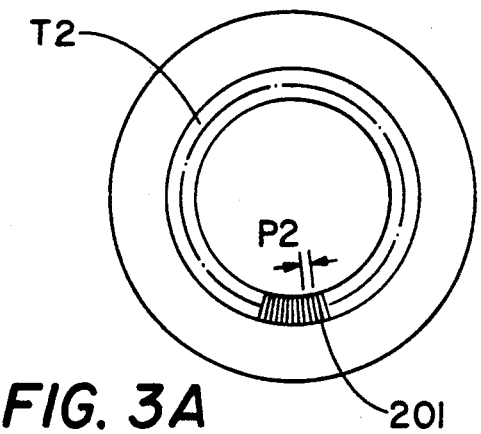
FIGS. 3A-3C are separate views of three members of a reducer unit of the present invention.
Figure 3E:
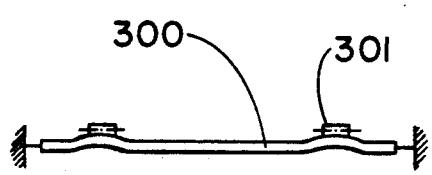
FIG. 3E is a top view of the member shown in FIG. 3B.
Figure 3B:
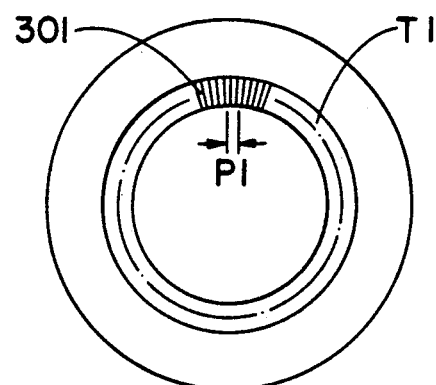
Figure 3F:
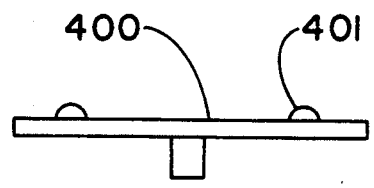
FIG. 3F is a top view of the member shown in FIG. 3C.
Figure 3C:
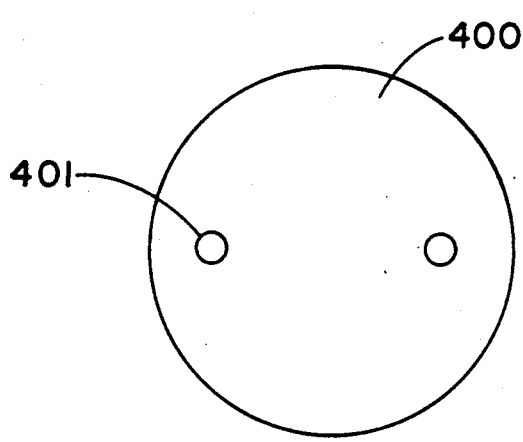

FIGS. 1 and 2 show an embodiment of the present invention used as a clock or a watch. A pinion 160 is driven by a motor which is mounted to a base 90. The pinion 160 rotates a second wheel 10 at a constant speed so that a second pointer 14 mounted on the top of an axle 103 rotates clockwise. There are two salient portions 102 furnished 180° apart on the upper surface 101 of the second wheel 10. The salient portions 102 may be formed with rollers. A first flexible member 11 lying upon the second wheel 10 is fixed with its rim to the base 90 by rings 80 and 70. A ring gear 112 is furnished on the upper surface of the first flexible member 11. The ring gear 112 is forced to wave by the rotation of the second wheel 10 with the a ring gear 130 located beyond the first flexible member 11.

The ring gear 130 is fastened to a minute wheel 20 by a friction plate 140 and is caused to rotate by waving engagement of the ring gear 112 of the first flexible member 11. The minute wheel 20 rotates in a reduction ratio of 1/60 to the second wheel 10.

The friction plate 140 is fixed by screws 150 or is pressed by a disk spring (not shown) to the minute wheel 20 so as to provide sufficient friction force between the ring gear 130 and the minute wheel 20. The minute wheel 20 with its rim supported between fixed rings 70 and 60 is able to rotate.

A ring gear 202 is furnished on the lower surface of the minute wheel 20, and an adjusting rod 120 pivoted on the ring 70 has a pinion 121 at its end. By engagement of the pinion 121 with the ring gear 202 when the adjusting rod 120 is pulled outside, the minute wheel 20 can be rotated for time adjusting i.e. the adjusting rod 120 overcomes the frictional force between the ring gear 130 and the minute wheel 20 to make the minute wheel 20 sliding and rotating relatively while the ring gear 130 stands still with the flexible member 11. The minute wheel 20 extends upward a minute axle 203 for mounting a minute hand 25.

There also are salient portions 201 on the upper surface of the minute wheel 20 to provide the same function as that of the salient portions 102 of the second wheel 10, i.e. to generate waving motion of a ring gear 172 furnished on a second flexible member 17.

The second flexible member 17 is supported with its rim fixed to rings 50 and 60. There is an hour wheel 30 located beyond the second flexible member 17. The hour wheel 30 is turnably supported with its rim between the ring 50 and a face plate 40.

A ring gear 30 is furnished on the lower surface of the hour wheel 301 to receive the waving engagement of the ring gear 172 of the second flexible member 17, so that the hour wheel 30 rotates in a reduction ratio of 1/12 to the minute wheel 20. An hour axle 302 is extended upward from the hour wheel 30 for mounting an hour hand 33.

In fact, the above embodiment includes two sets of piled reducer unit: the second wheel 10, the first flexible member 11 and the ring gear 130 of the minute wheel 20 constitute the first reducer unit and the salient portions 201 of the minute wheel 20, the second flexible member 17 and the hour wheel 30 form the second reducer unit, that is, each reducer unit contains basically an input member, a flexible member and an output member.

Referring now to FIG. 3, it is a structural illustration of an output member 200, a flexible member 300, and an input member 400 as a reducer unit. A surface of the input member 400 that facing the flexible member 300 has salient portions 401 for partially pushing a ring gear 301 furnished on the flexible member 300 to engage to a ring gear 201 furnished on the output member 200. The ring gears 301 and 201 have numbers of tooth T1, T2 and circular pitches P1 and P2 respectively, and have equal pitch circle C; i.e., $P1 \cdot T1 = P2 \cdot T2 = C$, while there is a little difference between with the ring gear 201 by means of the salient portions 401 rotating, the output member 200 gets a rotation ratio $R = (T2 - T1)/T2$ relative to the input member 400.

Figure 4:
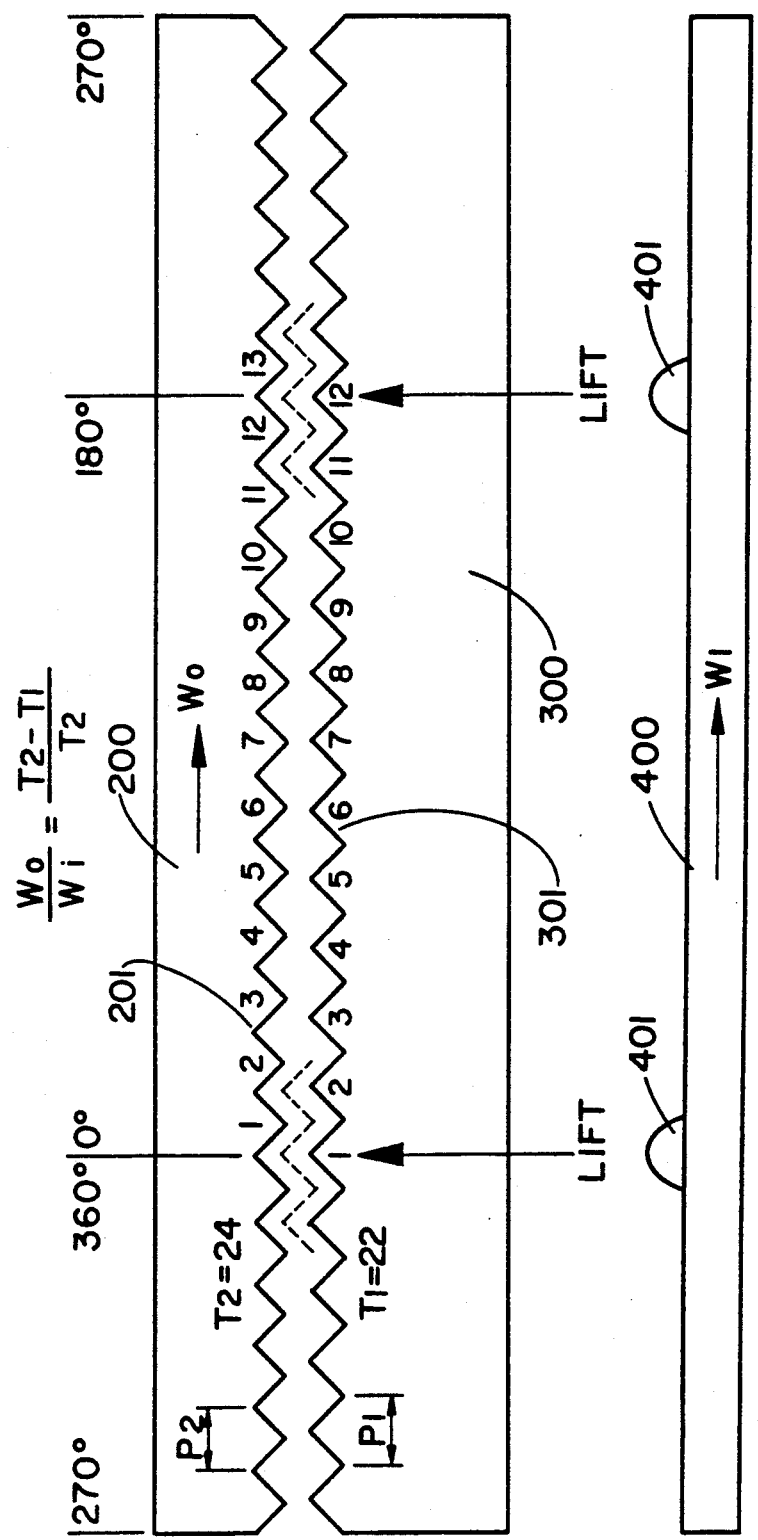
FIG. 4 is a development showing the waving gear engagement of the present invention.

The salient portions 401 can be one raised part or many raised parts that lay equiangularly around a circle on the input member 400 and the tooth difference $T2 - T1$ must be a multiple of the number of salient portions N, so that all salient portions 401 are on the same action phase. Refering now to FIG. 4, it shows a development of the engagement of aforesaid ring gear 201, 301 and the salient portions 401. When the salient portions 401 of the input member 400 rotates with an angular speed $Wi$, parts of the ring gear 301 is orderly lifted and engaged (shown by arrows and dotted lines in FIG. 4) with the ring.

If the tooth number of the ring gear 301 is T1=22 and the tooth number of the ring gear 201 is T2=24, then the angular speed Wo of the output member 200 is $$Wo = \frac{T2 - T1}{T2} Wi = \frac{24 - 22}{24} = \frac{1}{12} Wi$$

so the reduction ratio is 1:12. Similarly, we may design it with a reduction ratio as 1:60 or others.

In conclusion, the present invention provides a thin reduction unit with coaxial output and input members.

It can be piled to form a multistage reducer for replacing the transmission of a clock or a watch, which will reduce the number of parts, simplify assembly process, and reduce manufacturing cost.

As many other possible embodiments, signularly or in combination, may be made from the present invention without departing from the scope thereof, it is to be understood that all matters set forth herein or shown in the accompanying drawings are to be interpreted in an illustrative and not a limiting sense.

I claim:

1. An end-face waving gear reducer comprises:
a base;
an input member, having an axle pivotally mounted on said base for rotational input;
an output member, having an axle pivotally mounted on said base for rotational output; said two axles are coaxial;
a plane flexible member, whose rim is fixed to said base, laying between said input member and said output member; a surface of said flexible member facing said output member is furnished with a ring gear having a number of teeth T1 and a circular pitch P1;
a surface of said output member facing said flexible member is furnished with a ring gear opposing said ring gear of said flexible member, which has a number of teeth T2 and a circular pitch P2; said two ring gears are disengaged when no external force is applied to said flexible member;
a surface of said input member facing said flexible member has a number $N(\geq 1)$ salient portions which partially push said flexible member against said output member; wherein said two ring gears consist of a number teeth having a pitch that follows an equation: $P1 \cdot T1 = P2 \cdot T2 = C$, in which C is a constant; when $N > 1$, $(T2-T1)/N$ is an integer and those N salient portions are equiangularly arranged in a circle with circular length C on said input member; therefore, said output member obtains a reductive rotation ratio R relative to said input member, where $R = (T2-T1)/T2$.

2. An end-face waving gear reducer comprises:
a base;
an input member, having an axle pivotally mounted on said base for rotational input;
an output member, having an axle pivotally mounted on said base for rotational output; said two axles are coaxial;
a plane flexible member, whose rim is fixed to said base, laying between said input member and said output member; a surface of said flexible member facing said output member is furnished with a ring gear having a number of teeth T1 and a circular pitch P1;
a surface of said output member facing said flexible member is furnished with a ring gear opposing said ring gear of said flexible member, which has a number of teeth T2 and a circular pitch P2; said two ring gears are disengaged when no external force is applied to said flexible member;
a surface of said input member facing said flexible member has a number $N(\geq 1)$ salient portions which partially push said flexible member against said output member; said two ring gears follow an equation: $P1 \cdot T1 = P2 \cdot T2 = C$, in which C is a constant; when $N > 1$, $(T2-T1)/N$ is an integer and those N salient portions are equiangularly arranged in a circle with circular length C on said input member; therefore, said output member obtains a reductive rotation ratio R relative to said input member, where $R = (T2-T1)/T2$;
at least a reducer with the same components thereof piled together to form a multistage reducer with former and latter reducer units, in which the input member of a latter unit fixedly connects with the output member of a former unit.

3. An end-face waving gear reducer comprises:
a base;
an input member, having an axle pivotally mounted on said base for rotational input;
an output member, having an axle pivotally mounted on said base for rotational output; said two axles are coaxial;
a plane flexible member, whose rim is fixed to said base, laying between said input member and said output member; a surface of said flexible member facing said output member is furnished with a ring gear having a number of teeth T1 and a circular pitch P1;
a surface of said output member facing said flexible member is furnished with a ring gear opposing said ring gear of said flexible member, which has a number of teeth T2 and a circular pitch P2; said two ring gears are disengaged when no external force is applied to said flexible member;
a surface of said input member facing said flexible member has a number $N(\geq 1)$ salient portions which partially push said flexible member against said output member; said two ring gears follow an equation: $P1 \cdot T1 = P2 \cdot T2 = C$, in which C is a constant; when $N > 1$, $(T2-T1)/N$ is an integer and those N salient portions are equiangularly arranged in a circle with circular length C on said input member; therefore, said output member obtains a reductive rotation ratio R relative to said input member, where $R = (T2-T1)/T2$;
wherein said gear of the output member is formed as an independent member with a substance of the output member but relative-rotatably join each other by friction means, whereby, said substance of the output member is able to slide and rotate relatively to said ring gear member when overcoming a frictional force there.

4. An end-face waving gear reducer comprises:
a base;
an input member, having an axle pivotally mounted on said base for rotational input;
an output member, having an axle pivotally mounted on said base for rotational output; said two axles are coaxial;
a plane flexible member, whose rim is fixed to said base, laying between said input member and said output member; a surface of said flexible member facing said output member is furnished with a ring gear having a number of teeth T1 and a circular pitch P1;

a surface of said output member facing said flexible member is furnished with a ring gear opposing said ring gear of said flexible member, which has a number of teeth T2 and a circular pitch P2; said two ring gears are disengaged when no external force is applied to said flexible member;

a surface of said input member facing said flexible member has a number $N(\geq 1)$ salient portions which partially push said flexible member against said output member; said two ring gears follow an equation: $P1 \cdot T1 = P2 \cdot T2 = C$, in which C is a constant; when $N > 1$, $(T2 - T1)/N$ is an integer and those N salient portions are equiangularly arranged in a circle with circular length C on said input member; therefore, said output member obtains a reductive rotation ratio R relative to said input member, where $R = (T2 - T1)/T2$;

at least a reducer with the same components thereof piled together to form a multistage reducer with former and latter reducer units, in which the input member of a latter unit fixedly connects with the output member of a former unit; and wherein a ring gear of an output member is formed as an independent member with a substance of the output member but relative-rotatably join each other by friction means, whereby, said substance is able to rotate relatively to said ring gear member when overcoming a frictional force therein.

5. An end-face waving gear reducer comprises:

a base;

an input member, having an axle pivotally mounted on said base for rotational input;

an output member, having an axle pivotally mounted on said base for rotational output; said two axles are coaxial;

a plane flexible member, whose rim is fixed to said base, laying between said input member and said output member; a surface of said flexible member facing said output member is furnished with a ring gear having a number of teeth T1 and a circular pitch P1;

a surface of said output member facing said flexible member is furnished with a ring gear opposing said ring gear of said flexible member, which has a number of teeth T2 and a circular pitch P2; said two ring gears are disengaged when no external force is applied to said flexible member;

a surface of said input member facing said flexible member has a number $N (\geq 1)$ salient portions which partially push said flexible member against said output member; said two ring gears follow an equation: $P1 \cdot T1 = P2 \cdot T2 = C$, in which C is a constant; when $N > 1$, $(T2 - T1)/N$ is an integer and those N salient portions are equiangularly arranged in a circle with circular length C on said input member; therefore, said output member obtains a reductive rotation ratio R relative to said input member, where $R = (T2 - T1)/T2$;

at least a reducer with the same components hereof piled together to form a multistage reducer with former and latter reducer units, in which the input member of a latter unit fixedly connects with the output member of a former unit; and wherein the reducer is formed into a clock-like device as a two-stage reducer for driving a second hand, a minute hand and an hour hand, said reducer comprising: a first member as the input member of a former reducer unit, a second member as both the output member of the former reducer unit and the input member of a latter reducer unit; and a third member as the output member of the latter reducer unit, wherein, said first, second and third members having coaxial output axles for mounting said second minute and hour hands respectively; a ring gear member on said second member for wavering transmission is formed as an independent member with a substance of said second member but relative-rotatably join each other by friction means whereby, said substance of the second member is able to rotate relatively to said ring gear member thereon by overcoming a frictional force therein upon time adjustment.

* * * * *